US012770279B2

(12) United States Patent
Mori

(10) Patent No.: US 12,770,279 B2
(45) Date of Patent: Oct. 20, 2026

(54) IMAGE-BASED TIRE GROOVE DEPTH ESTIMATION DEVICE

(71) Applicant: TOYOTA JIDOSHA KABUSHIKI KAISHA, Aichi-ken (JP)

(72) Inventor: Hisamasa Mori, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 287 days.

(21) Appl. No.: 18/597,919

(22) Filed: Mar. 7, 2024

(65) Prior Publication Data

US 2024/0338836 A1 Oct. 10, 2024

(30) Foreign Application Priority Data

Apr. 7, 2023 (JP) ................................ 2023-063046

(51) Int. Cl.

| | |
|---|---|
| ***G06T 7/50*** | (2017.01) |
| ***G06T 7/00*** | (2017.01) |
| *B60C 11/24* | (2006.01) |
| *G01B 11/22* | (2006.01) |
| *G06T 7/11* | (2017.01) |

(52) U.S. Cl.

CPC .............. *G06T 7/50* (2017.01); *G06T 7/0002* (2013.01); *B60C 11/246* (2013.01); *G01B 11/22* (2013.01); *G06T 7/11* (2017.01); *G06T 2207/20081* (2013.01)

(58) Field of Classification Search

CPC . G06T 7/50; G06T 7/0002; G06T 7/11; G06T 2207/20081; B60C 11/246; G01B 11/22

See application file for complete search history.

(56) References Cited

U.S. PATENT DOCUMENTS

| | | | | |
|---|---|---|---|---|
| 10,773,557 B1 * | 9/2020 | Mast | ...................... | G01B 11/22 |
| 12,038,348 B1 * | 7/2024 | Okamoto | ............... | G06N 20/00 |
| 2015/0040656 A1 * | 2/2015 | Singh | .................... | B60C 11/246 73/146.5 |
| 2020/0001662 A1 * | 1/2020 | Storti | .................... | B60C 11/246 |
| 2020/0125887 A1 | 4/2020 | Nishii et al. | | |

(Continued)

FOREIGN PATENT DOCUMENTS

| | | | | |
|---|---|---|---|---|
| JP | 2019035626 A | 3/2019 | | |
| JP | 2021533029 A | * 12/2021 | ............... | B60C 7/01 |

(Continued)

*Primary Examiner* — Ian L Lemieux
*Assistant Examiner* — Noah William Boyar
(74) *Attorney, Agent, or Firm* — HAUPTMAN HAM, LLP

(57) ABSTRACT

An estimation device for estimating tire groove depth includes a memory and a processor. The processor acquires an image of a tread of a tire installed at a vehicle and estimates a depth of a groove of the tire based on the image using a depth estimation model. The processor may also acquire a travel history of the vehicle and estimate groove depth based on the travel history. When a difference between the image-based and travel history-based depth estimates exceeds a predetermined threshold, the device renders output to prompt actual measurement of the groove depth. The depth estimation model is re-learned using the actual measurement value as training data to improve estimation accuracy. The device estimates tire damage and is able to render output to replace the tire.

8 Claims, 5 Drawing Sheets

(56) References Cited

U.S. PATENT DOCUMENTS

| | | | | |
|---|---|---|---|---|
| 2020/0130420 | A1* | 4/2020 | Puranik | B60R 11/04 |
| 2020/0189328 | A1* | 6/2020 | Kretschmann | B60C 23/0488 |
| 2022/0324266 | A1* | 10/2022 | Alghooneh | B60C 11/246 |
| 2022/0326703 | A1* | 10/2022 | Raje | G05B 23/0283 |
| 2023/0099239 | A1* | 3/2023 | Reynolds | G05B 13/0265<br>700/47 |
| 2024/0253626 | A1* | 8/2024 | Sams | B60C 11/246 |
| 2024/0281948 | A1* | 8/2024 | Nasu | G06T 7/73 |
| 2025/0209859 | A1* | 6/2025 | Lemaire | B60C 11/246 |
| 2025/0238942 | A1 | 7/2025 | Iwata | |

FOREIGN PATENT DOCUMENTS

| | | | | | |
|---|---|---|---|---|---|
| JP | 7020581 | B1 | | 2/2022 | |
| JP | 2022023401 | A | | 2/2022 | |
| JP | 2022082175 | A | * | 6/2022 | |
| JP | 2022-160933 | A | | 10/2022 | |
| WO | WO-2017156213 | A1 | * | 9/2017 | B60C 11/246 |
| WO | WO-2020205703 | A1 | * | 10/2020 | G06N 7/01 |
| WO | WO-2022070176 | A1 | * | 4/2022 | H04N 23/56 |

* cited by examiner

IMAGE-BASED TIRE GROOVE DEPTH ESTIMATION DEVICE

CROSS-REFERENCE TO RELATED APPLICATION

This application claims priority under 35 USC 119 from Japanese Patent Application No. 2023-063046 filed Apr. 7, 2023, the disclosure of which is incorporated by reference herein in its entirety.

BACKGROUND

Technical Field

The present disclosure relates to an estimation device.

Related Art

Japanese Patent Application Laid-Open (JP-A) No. 2022-160933 discloses a device that estimates a state of wear of a tire installed at a vehicle. The device includes an inclination calculation section that is configured to calculate an inclination of a slip ratio with respect to a driving force, based on a large number of data sets of the slip ratio and the driving force, serving as a regression coefficient representing a linear relationship between the slip ratio calculated based on sequentially acquired rotational speeds of a tire and the driving force of the vehicle.

Moreover, the device includes an index representing a temperature dependency of an inclination, an inclination correction section that is configured to correct the calculated inclination based on the temperature outside the vehicle at a time of correction, and an estimation section that is configured to estimate a state of wear of the tire based on the corrected inclination.

SUMMARY

The device disclosed in Japanese Patent Application Laid-Open (JP-A) No. 2022-160933 has a problem in that the depth of a groove of a tire cannot be estimated without information relating to the vehicle.

The present disclosure has been made in consideration of the above facts, and provides an estimation device that is capable of easily estimating the depth of a groove of a tire, as compared to a case in which information relating to a vehicle is required.

An estimation device according to a first aspect of the present disclosure includes a memory and a processor coupled to the memory. The processor is configured to: acquire an image of a tread of a tire that is installed at a vehicle; and estimate a depth of a groove of the tire based on the image.

In the estimation device according to the first aspect, the processor acquires an image of a tread of a tire that is installed at a vehicle, and estimates a depth of a groove of the tire based on the image. The estimation device according to the first aspect enables the depth of a groove of a tire to be estimated more easily compared to a case in which information relating to the vehicle is required.

An estimation device according to a second aspect of the present disclosure is the estimation device according to the first aspect, in which the processor is configured to: acquire a travel history of the vehicle; estimate the depth of the groove based on the travel history; and in a case in which a difference between the depth of the groove estimated based on the image and the depth of the groove estimated based on the travel history is greater than or equal to a predetermined difference, render output to actually measure the depth of the groove.

According to the estimation device of the second aspect, in a case in which the difference between the depth of the groove estimated based on the image and the depth of the groove estimated based on the travel history is greater than or equal to a predetermined difference, the actual measurement value of the depth of the groove of the tire is measured.

An estimation device according to a third aspect of the present disclosure is the estimation device according to the second aspect, in which the processor is configured to: estimate the depth of the groove by inputting the acquired image to a depth estimation model learned using a set of the image and the depth of the groove as training data; acquire an actual measurement value of the depth of the groove; and re-learn the depth estimation model using a set of the image and the actual measurement value as training data.

According to the estimation device of the third aspect, the depth estimation model is re-learned using the acquired actual measurement value in a case in which the difference between the depth of the groove estimated based on the image and the depth of the groove estimated based on the travel history is greater than or equal to a predetermined difference. Compared to a case in which re-learning is not performed, the estimation accuracy of the depth estimation model can be improved.

An estimation device according to a fourth aspect of the present disclosure is the estimation device according to any one of the first aspect to the third aspect, in which, in a case in which the depth of the groove estimated based on the image is less than a predetermined depth, the processor is configured to render output to replace the tire.

According to the estimation device of the fourth aspect, a user can understand that the tire must be replaced in a case in which the depth of the groove is less than a predetermined depth.

An estimation device according to a fifth aspect of the present disclosure is the estimation device according to any one of the first aspect to the fourth aspect, in which the processor is configured to: estimate, based on the image, whether or not damage has occurred at the tire; and in a case in which the processor has estimated that damage has occurred at the tire, render output to replace the tire.

According to the estimation device of the fifth aspect, a user can understand that damage has occurred at the tire.

The present disclosure enables the depth of a groove of a tire to be estimated more easily than in a case in which information relating to the vehicle is required.

DETAILED DESCRIPTION

Figure 1:
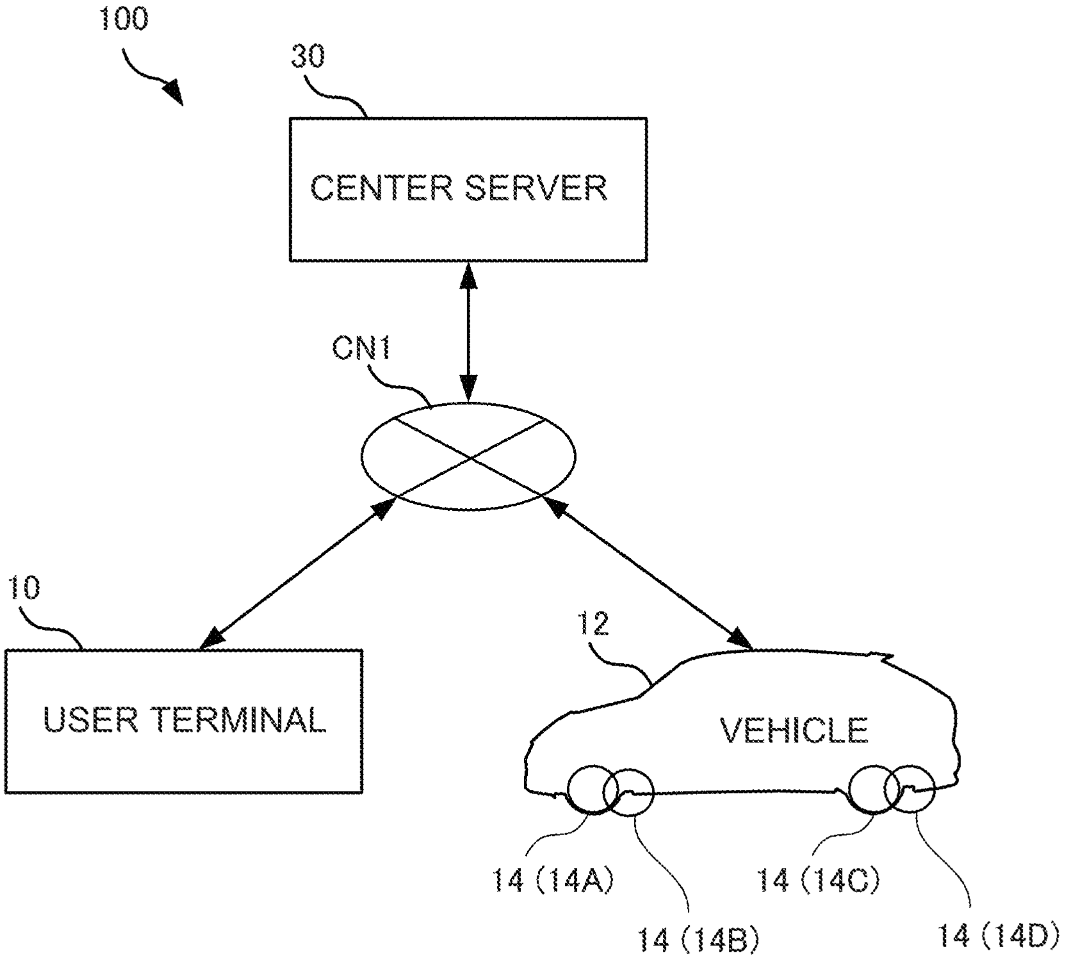
FIG. 1 is a diagram illustrating an example of a schematic configuration of an estimation system according to an exemplary embodiment.

As illustrated in FIG. 1, an estimation system 100 of the present exemplary embodiment includes a user terminal 10, a vehicle 12, and a center server 30. The center server 30 is an example of an estimation device. Note that the number of user terminals 10 and vehicles 12 included in the estimation system 100 is not limited to the number illustrated in FIG. 1. The user terminal 10, the vehicle 12, and the center server 30 are connected to each other via a network CN1.

As illustrated in FIG. 1, a vehicle 12 of the present exemplary embodiment is installed with tires 14A to 14D. Hereinafter, in cases in which the tires 14A to 14D are not distinguished from each other, these are simply referred to as the "tire 14". Note that in the present exemplary embodiment, a four-wheel vehicle is applied as the vehicle 12, and the vehicle 12 is installed with four tires 14. However, the present disclosure is not limited to this example. A two-wheel vehicle may be applied as the vehicle 12. In this case, the vehicle 12 is installed with two tires 14.

The user terminal 10 is an information processing terminal possessed by a user. The user terminal 10 is, for example, a portable information processing terminal such as a smartphone.

Figure 2:
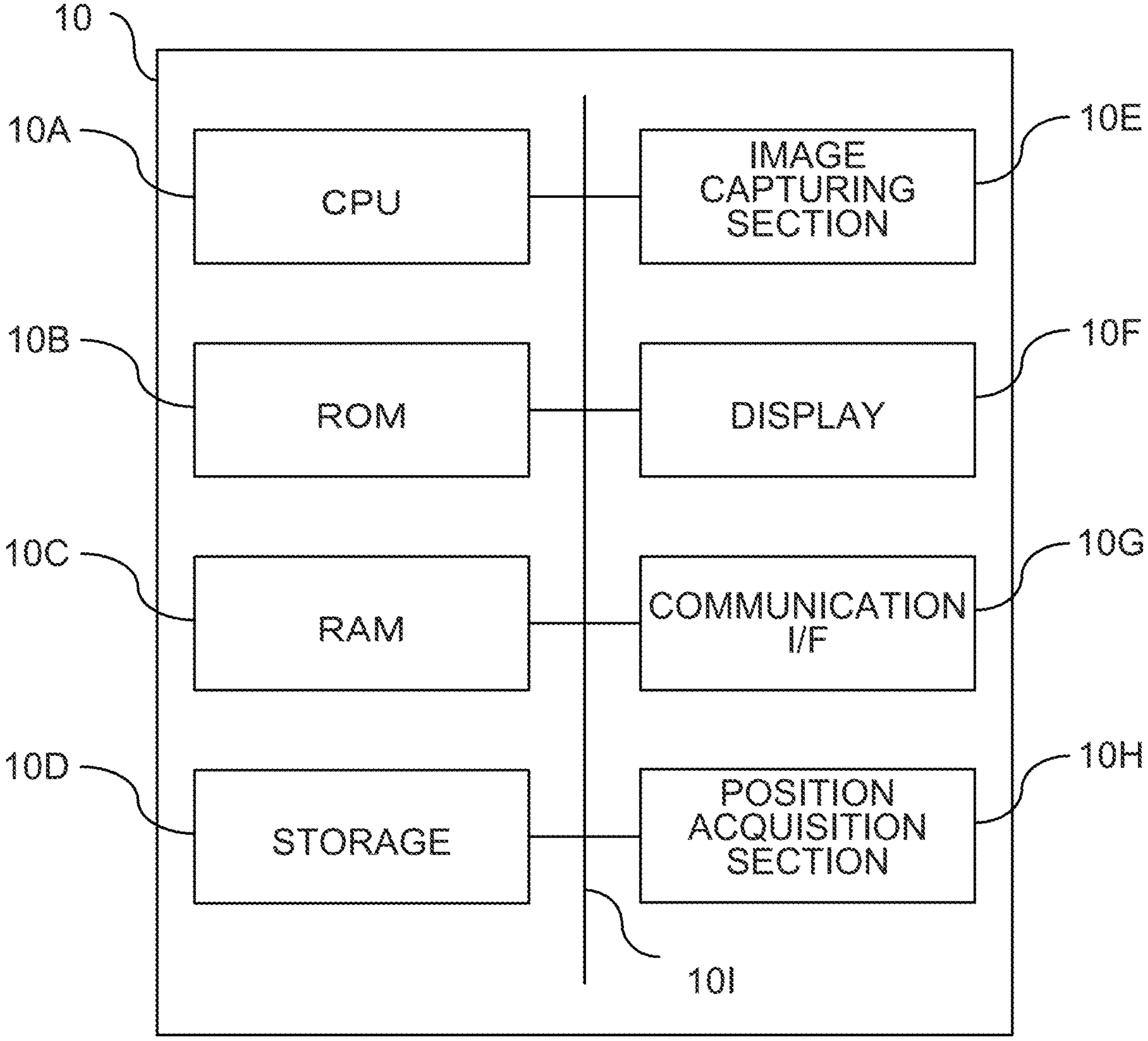
FIG. 2 is a block diagram illustrating an example of a hardware configuration of a user terminal according to an exemplary embodiment.

As illustrated in FIG. 2, the user terminal 10 includes a central processing unit (CPU) 10A, read only memory (ROM) 10B, random access memory (RAM) 10C, storage 10D, an image capturing section 10E, a display 10F, a communication interface (I/F) 10G, and a position acquisition section 10H. The CPU 10A, the ROM 10B, the RAM 10C, the storage 10D, the image capturing section 10E, the display 10F, the communication I/F 10G, and the position acquisition section 10H are communicably connected to each other via a bus 10I.

The CPU 10A is a central processing unit that executes various programs and controls various components. Namely, the CPU 10A reads a program from the ROM 10B or the storage 10D, and executes the program using the RAM 10C as a workspace. The CPU 10A controls the respective configurations described above and performs a variety of computation processing in accordance with programs stored in the ROM 10B or the storage 10D.

The ROM 10B stores various programs and various data. The RAM 10C serves as a workspace to temporarily store programs and data. The storage 10D is configured by a hard disk drive (HDD) or a solid state drive (SSD), and stores various programs including an operating system, as well as various data.

The image capturing section 10E is a camera that captures an image of a tread (hereinafter also referred to as a "tread image") of the tire 14 installed at the vehicle 12.

The communication I/F 10G is an interface for connecting to the network CN1.

The display 10F is, for example, a liquid crystal display, and displays various information. The display 10F may adopt a touch panel method to function as an input portion.

The position acquisition section 10H acquires a capturing position at which a tread image has been captured. The position acquisition section 10H includes a non-illustrated antenna that receives radio signals from a global positioning system (GPS) satellite and a quasi-zenith satellite system (for example, "Michibiki").

Figure 3:
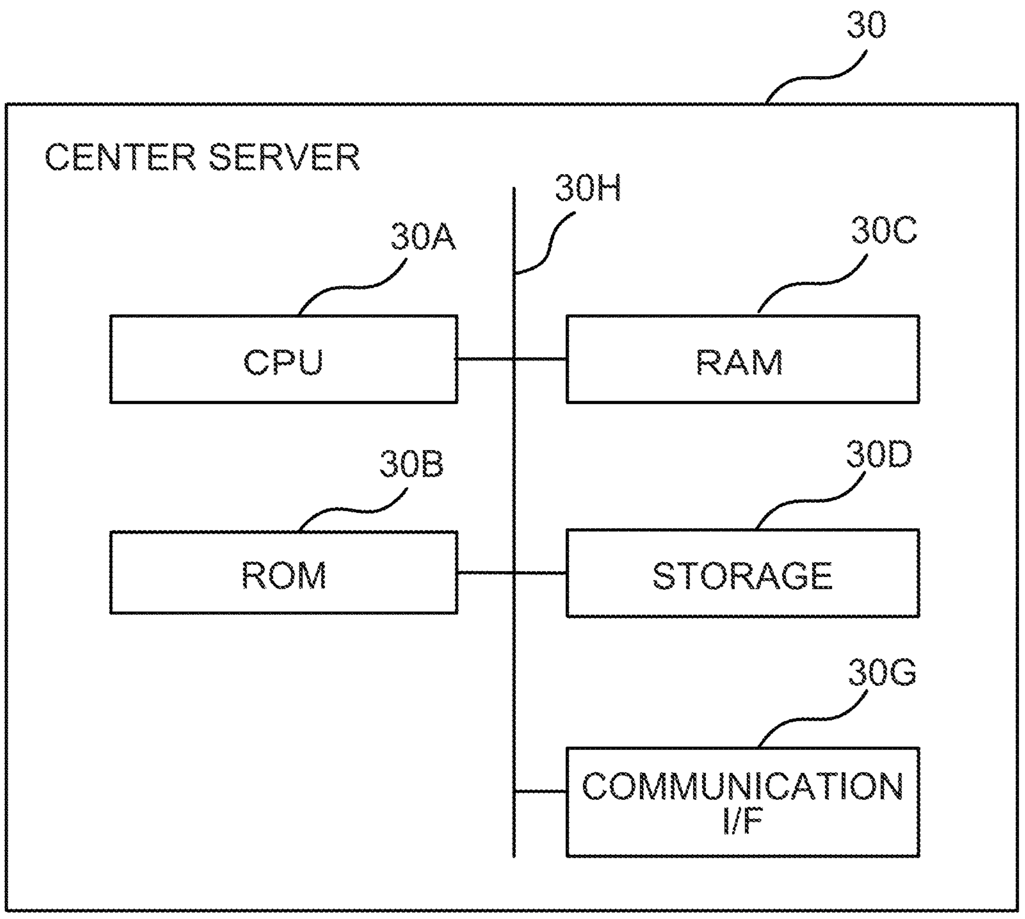
FIG. 3 is a block diagram illustrating an example of a hardware configuration of a center server according to an exemplary embodiment.

As illustrated in FIG. 3, the center server 30 includes a CPU 30A, ROM 30B, RAM 30C, storage 30D, and a communication I/F 30G. The CPU 30A, the ROM 30B, the RAM 30C, the storage 30D, and the communication I/F 30G are communicably connected to each other via an internal bus 30H.

The CPU 30A is a central processing unit that executes various programs and controls various components. Namely, the CPU 30A reads a program from the ROM 30B or the storage 30D, and executes the program using the RAM 30C as a workspace. The CPU 30A controls the respective configurations described above and performs a variety of computation processing in accordance with programs stored in the ROM 30B or the storage 30D. In the present exemplary embodiment, an estimation program, a depth estimation model, a depth estimation equation, and a damage estimation model are stored in the ROM 30B or the storage 30D.

The ROM 30B stores various programs and various data. The RAM 30C serves as a workspace to temporarily store programs and data. The storage 30D is configured by an HDD or an SSD, and stores various programs including an operating system, as well as various data.

The estimation program is a program for implementing various functions of the center server 30.

The depth estimation model is a model that estimates a depth of a groove of the tire 14 based on the tread image. More specifically, the depth estimation model is a trained model in which a set of a tread image and a depth of a groove of the tire 14 is learned as training data.

The depth estimation equation is an equation that estimates the depth of the groove of the tire 14 based on a travel history of the vehicle 12. More specifically, the depth estimation equation is determined based on an actual measurement value of the depth of the groove of the tire 14. The depth estimation equation is determined such that the longer the travel distance of the vehicle 12, the shallower the depth of the groove of the tire 14. Note that the depth estimation equation may differ for each type of tire 14 and each tread pattern.

The damage estimation model is a model that estimates whether or not damage has occurred at the tire 14 based on the tread image. Damage according to the present exemplary embodiment includes scratches, splitting, cracks, or uneven wear of the tire 14. More specifically, the damage estimation model is a trained model in which a tread image and the presence or absence of damage to the tire 14 are learned as training data.

The communication I/F 30G is an interface for connecting to the network CN1.

Figure 4:
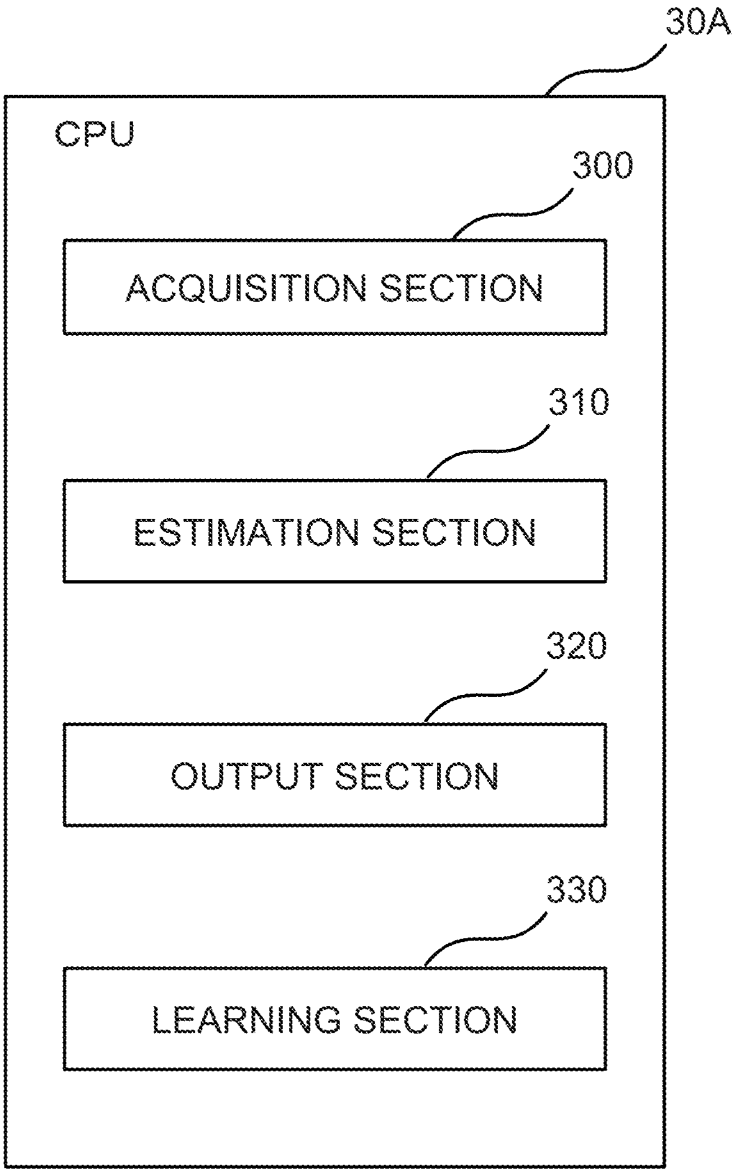
FIG. 4 is a block diagram illustrating an example of a functional configuration of a CPU in the center server according to an exemplary embodiment.

FIG. 4 is a block diagram illustrating an example of a functional configuration of the CPU 30A. As illustrated in FIG. 4, the CPU 30A includes an acquisition section 300, an estimation section 310, an output section 320, and a learning section 330. The respective functional configurations are implemented by the CPU 30A reading and executing the estimation program stored in the ROM 30B or the storage 30D.

The acquisition section 300 has a function of acquiring a tread image. In the present exemplary embodiment, the acquisition section 300 acquires a tread image from the user terminal 10 via the communication I/F 30G.

Moreover, the acquisition section 300 has a function of acquiring a capturing position at which a tread image has been captured. In the present exemplary embodiment, the acquisition section 300 acquires a capturing position from the user terminal 10 via the communication I/F 30G.

Moreover, the acquisition section 300 has a function of acquiring an actual measurement value of the depth of the groove of the tire 14. In the present exemplary embodiment, in a case in which the output section 320, which is described below, renders output to actually measure the depth of the groove of the tire 14, the acquisition section 300 acquires an actual measurement value of the depth of the groove of the tire 14 from the user terminal 10 via the communication I/F 30G.

Moreover, the acquisition section 300 has a function of acquiring a travel history of the vehicle 12. In the present exemplary embodiment, the acquisition section 300 acquires, from the vehicle 12, via the communication I/F 30G, a travel distance of the vehicle 12 (hereinafter also referred to simply as the "travel distance") from a time at which the tire 14 is installed at the vehicle 12. However, the present disclosure is not limited to this example. For example, the acquisition section 300 may acquire, from the vehicle 12, a travel history in which a travel date and time of the vehicle 12 and a travel speed of the vehicle 12 are associated with each other. Moreover, the acquisition section 300 may acquire, from the vehicle 12, at least one of the type of the tire 14 (for example, a summer tire, a studless tire, an all-season tire, a radial tire or a bias tire) or a tread pattern (for example, a rib type, a lug type, a rib-lug type or a block type). Further, the acquisition section 300 may acquire at least one of the size of the tire 14 or the brand name of the tire 14 instead of at least one of the type of the tire 14 or the tread pattern of the tire 14.

The estimation section 310 has a function of estimating the depth of the groove of the tire 14 based on the tread image acquired by the acquisition section 300. In the present exemplary embodiment, the estimation section 310 inputs the tread image acquired by the acquisition section 300 to the depth estimation model to estimate the depth of the groove of the tire 14.

However, the present disclosure is not limited to this example. For example, the estimation section 310 calculates a local binary pattern (LBP) feature value from the tread image. The depth of the groove of the tire 14 may be estimated by inputting the calculated LBP feature value to a trained model learned using a set of the LBP feature value and the depth of the groove of the tire 14 as training data.

Moreover, the estimation section 310 may estimate the depth of the groove of the tire 14 based on whether or not a slip sign is present in the tread image. For example, the estimation section 310 inputs the tread image acquired by the acquisition section 300 to a trained model learned using a set of a tread image and whether or not a slip sign is present in the tread image as training data, thereby estimating whether or not the slip sign is present in the tread image. Moreover, in a case in which the estimation section 310 determines that the tire 14 has a slip sign, the depth of the groove of the tire 14 may be estimated to be less than or equal to 1.6 mm, and in a case in which it is determined that the tire 14 does not have a slip sign, the depth of the groove of the tire 14 may be estimated to be greater than or equal to 1.6 mm.

Moreover, the estimation section 310 has a function of estimating the depth of the groove of the tire 14 based on the travel history of the vehicle 12. The estimation section 310 inputs the travel distance acquired by the acquisition section 300 into the depth estimation equation to estimate the depth of the groove of the tire 14. Note that in a case in which the depth estimation equation differs for each type of tire 14, the estimation section 310 may estimate the depth of the groove of the tire 14 by inputting the travel distance acquired by the acquisition section 300 to a depth estimation equation, which corresponds to a type of tire 14 acquired by the acquisition section 300. In a case in which the depth estimation equation differs for each tread pattern, the estimation section 310 may estimate the depth of the groove of the tire 14 by inputting the travel distance acquired by the acquisition section 300 to a depth estimation equation, which corresponds to a tread pattern of the tire 14 acquired by the acquisition section 300.

Moreover, the estimation section 310 has a function of estimating whether or not damage has occurred at the tire 14 based on the tread image. The estimation section 310 inputs the tread image acquired by the acquisition section 300 to the damage estimation model, and estimates whether or not damage has occurred at the tire 14. However, the present disclosure is not limited to this example. For example, the estimation section 310 may group tread images by inputting the acquired tread images to an untrained model, and estimate that the tread image belonging to the smallest group is the tread image of the tire 14 at which damage has occurred. This is, because it is assumed that the number of tires 14 for which damage has occurred is less than the number of tires 14 for which damage has not occurred.

Moreover, the estimation section 310 estimates, among the tires 14A to 14D installed at the vehicle 12, which tire 14 has the tread image acquired by the acquisition section 300. The estimation section 310 estimates the tire 14 having the tread image based on the capturing position acquired by the acquisition section 300. More specifically, in the event that an image in which a distance between a predetermined reference tire (for example, the tire 14A corresponding to the left front wheel) and the capturing position is the largest, the estimation section 310 estimates that the image is a tread image of a tire installed at a different position in a front-rear position from the reference tire and at a different position in a left-right position from the reference tire (for example, the tire 14D corresponding to the right rear wheel). Moreover, in the event that an image in which the distance between the reference tire and the capturing position is the smallest, the estimation section 310 estimates that the image is a tread image of a tire installed at the same position in the front-rear position as the reference tire and at a different position in the left-right position from the reference tire (for example, the tire 14B corresponding to the right front wheel). Moreover, in the event that an image in which the distance between the reference tire and the capturing position is the second largest, the estimation section 310 estimates that the image is a tread image of a tire installed at a different position in the front-rear position from the reference tire and at the same position in the left-right position as the reference tire (for example, the tire 14C corresponding to the left rear wheel). It should be noted that the reference tire is predetermined by, for example, the user terminal 10.

The output section 320 has a function to render output to replace the tire in a case in which the depth of the groove estimated based on the tread image is less than a predetermined depth. The predetermined depth is predetermined by an administrator or the like of the center server 30. However, the present disclosure is not limited to this example. The predetermined depth may be set for each type of tire 14 of the vehicle 12. For example, the predetermined depth may be set to 4 mm in a case in which the tire 14 is a summer tire, or may be set to 50% of the depth of the groove when the tire 14 is brand new in a case in which the tire 14 is a studless tire. Further, the output section 320 may output which tire 14 among the tires 14A to 14D has a groove depth that is less than a predetermined depth.

Moreover, in a case in which the depth of the groove estimated based on the tread image is less than a predetermined depth, the output section 320 renders output, to the user terminal 10, to replace the tire 14. However, the present disclosure is not limited to this example. For example, in a case in which the depth of the groove is less than a predetermined depth, the output section 320 may render output, to the vehicle 12 or to a terminal or the like possessed by the dealer that sold the vehicle 12, to replace the tire 14.

The output section 320 may output the estimated depth of the groove regardless of whether or not the depth of the groove estimated based on the tread image is less than a predetermined depth.

Moreover, in a case in which the difference between the depth of the groove estimated based on the tread image and the depth of the groove estimated based on the travel history is greater than or equal to a predetermined difference, the output section 320 has a function to render output to actually measure the depth of the groove of the tire 14. The predetermined difference is predetermined by an administrator or the like of the center server 30. However, the present disclosure is not limited to this example. For example, the predetermined difference may be determined based on the travel distance of the vehicle 12. More specifically, the predetermined difference may be determined so as to increase as the travel distance of the vehicle 12 increases.

Moreover, in the present exemplary embodiment, in a case in which the difference between the depth of the groove estimated based on the tread image and the depth of the groove estimated based on the travel history is greater than or equal to a predetermined difference, the output section 320 renders output, to the user terminal 10, to actually measure the depth of the groove of the tire 14. However, the present disclosure is not limited to this example. For example, in a case in which the aforementioned difference is greater than or equal to a predetermined difference, the output section 320 may render output, to the vehicle 12 or to a terminal or the like possessed by the dealer that sold the vehicle 12, to replace the tire 14.

Moreover, in the present exemplary embodiment, in a case in which it is estimated that damage has occurred at the tire 14, the output section 320 has a function to render output to replace the tire 14. In a case in which it is estimated that damage has occurred at the tire 14, regardless of the depth of the groove estimated based on the tread image and the depth of the groove estimated based on the travel history, the output section 320 renders output to replace the tire 14. However, the present disclosure is not limited to this example. For example, in a case in which at least one of the depth of the groove estimated based on the tread image or the depth of the groove estimated based on the travel history is less than a predetermined depth, and it is estimated that damage has occurred at the tire 14, the output section 320 may render output to replace the tire 14. Moreover, the output section 320 may output which tire 14 among the tires 14A to 14D is the tire 14 for which it is estimated that damage has occurred.

Moreover, in the present exemplary embodiment, in a case in which it is estimated that damage has occurred at the tire 14, the output section 320 renders output, to the user terminal 10, to replace the tire 14. However, the present disclosure is not limited to this example. For example, in a case in which it is estimated that damage has occurred at the tire 14, the output section 320 may render output, to the vehicle 12 or to a terminal or the like possessed by the dealer that sold the vehicle 12, to replace the tire 14.

The learning section 330 has a function of re-learning the depth estimation model using the set of the tread image acquired by the acquisition section 300 and the actual measurement value of the depth of the groove of the tire 14 as training data. More specifically, the learning section 330 re-learns the depth estimation model using the set of the tread image acquired by the acquisition section 300, and the actual measurement value of the groove of the tire 14 acquired by the acquisition section 300 in a case in which the output section 320 renders output to actually measure the depth of the groove of the tire 14, as training data. The learning section 330 then stores the re-learned depth estimation model in the ROM 30B or the storage 30D.

Note that the learning section 330 may learn the depth estimation model and the damage estimation model in advance. More specifically, the learning section 330 may learn the depth estimation model using the previously acquired tread image and the depth of the groove of the tire 14 as training data, and store the depth estimation model in the ROM 30B or the storage 30D. Further, the learning section 330 may learn the damage estimation model using the previously acquired tread image and the presence or absence of damage to the tire 14 as training data, and store the damage estimation model in the ROM 30B or the storage 30D. Moreover, the depth estimation model and the damage estimation model may be learned in advance by devices other than the center server 30.

Figure 5:
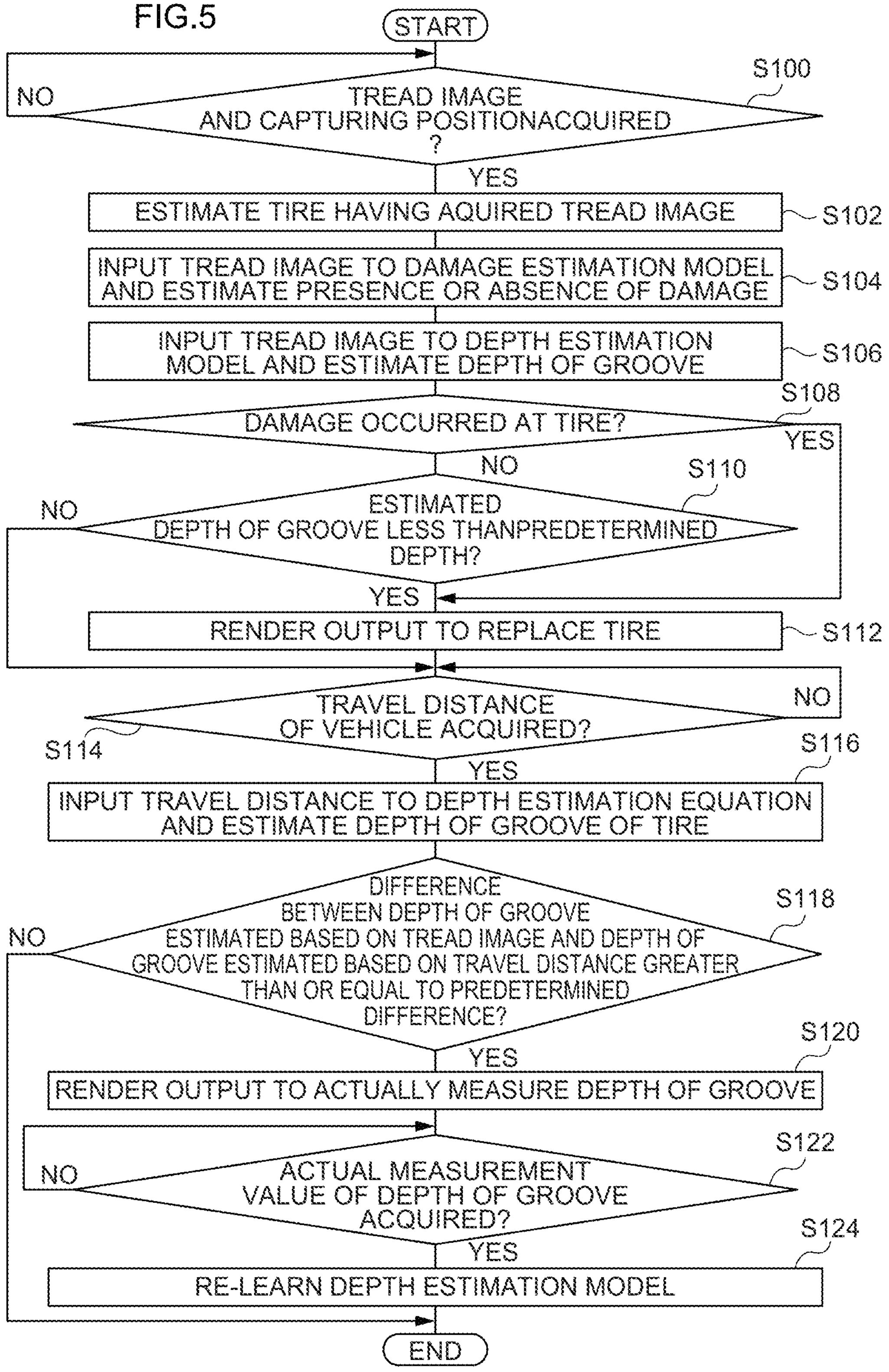
FIG. 5 is a flowchart illustrating an example of a flow of estimation processing according to an exemplary embodiment.

Next, explanation follows regarding a flow of estimation processing, with reference to FIG. 5. The estimation processing is performed by the CPU 30A reading the estimation program from the ROM 30B or the storage 30D, and loading and executing the program in the RAM 30C.

At step S100 in FIG. 5, the CPU 30A waits until the tread image and the capturing position at which the tread image was captured are acquired from the user terminal 10. Once the CPU 30A acquires the tread image and the capturing position (step S100: YES), the processing transitions to step S102. Note that the CPU 30A may acquire the tread image and the capturing position at different timings.

At step S102, the CPU 30A estimates, among the tires 14A to 14D installed at the vehicle 12, which tire 14 having the tread image acquired at step S100.

At step S104, the CPU 30A inputs the tread image acquired at step S100 to the damage estimation model, and estimates whether or not damage has occurred at the tire 14.

At step S106, the CPU 30A inputs the tread image acquired at step S100 to the depth estimation model, and estimates the depth of the groove of the tire 14.

At step S108, the CPU 30A determines whether or not it is estimated that damage has occurred at the tire 14. In a case in which it is estimated that damage has occurred at the tire 14 (step S108: YES), the CPU 30A transitions to step S112. On the other hand, in a case in which it is not estimated that damage has occurred at the tire 14 (step S108: NO), the CPU 30A transitions to step S110.

At step S110, the CPU 30A determines whether or not the depth of the groove of the tire 14 estimated based on the tread image at step S108 is less than a predetermined depth. In a case in which the depth of the groove of the tire 14 estimated based on the tread image is less than the predetermined depth (step S110: YES), the CPU 30A transitions to step S112. On the other hand, in a case in which the depth of the groove of the tire 14 estimated based on the tread image is greater than or equal to the predetermined depth (step S110: NO), the CPU 30A transitions to step S114.

At step S112, the CPU 30A renders output, to the user terminal 10, to replace the tire 14.

At step S114, the CPU 30A waits until the travel distance of the vehicle 12 is acquired. Once the travel distance of the vehicle 12 is acquired (step S114: YES), the CPU 30A transitions to step S116.

At step S116, the CPU 30A inputs the travel distance acquired at step S114 to the depth estimation equation, and estimates the depth of the groove of the tire 14.

At step S118, the CPU 30A determines whether or not the difference between the depth of the groove estimated based on the tread image at step S106 and the depth of the groove estimated based on the travel distance at step S116 is greater than or equal to a predetermined difference. In a case in which the difference between the depth of the groove estimated based on the tread image and the depth of the groove estimated based on the travel distance is equal to or greater than the predetermined difference (step S118: YES), the CPU 30A transitions to step S120. On the other hand, in a case in which the difference between the depth of the groove estimated based on the tread image and the depth of the groove estimated based on the travel distance is less than the predetermined difference (step S118: NO), the CPU 30A ends the present estimation processing.

At step S120, the CPU 30A renders output, to the user terminal 10, to actually measure the depth of the groove of the tire 14.

At step S122, the CPU 30A waits until an actual measurement of the depth of the groove of the tire 14 is acquired from the user terminal 10. Once the CPU 30A acquires the actual measurement value of the depth of the groove of the tire 14 from the user terminal 10 (step S122: YES), the processing transitions to step S124.

At step S124, the CPU 30A re-learns the depth estimation model using the set of the tread image acquired at step S100 and the actual measurement value of the depth of the groove acquired at step S122 as training data, and ends the present estimation processing.

NOTES

Note that in the above-described exemplary embodiment, the center server 30 that is configured separately from the user terminal 10 is applied as the estimation device. However, the present disclosure is not limited to this example. A device incorporated in the user terminal 10 may be applied as the estimation device. Further, a device incorporated in the vehicle 12 may be applied as the estimation device.

Moreover, in the above-described exemplary embodiment, the estimation section 310 further estimates the depth of the groove of the tire 14 based on the travel history of the vehicle 12. However, the present disclosure is not limited to this example. For example, the estimation section 310 may estimate the depth of the groove based on the number of revolutions of the tire 14 or the like. In this case, in a case in which the difference between the depth of the groove estimated based on the tread image and the depth of the groove estimated based on the number of revolutions or the like of the tire 14 is greater than or equal to a predetermined difference, the output section 320 renders output, to the user terminal 10, to actually measure the depth of the groove of the tire 14.

Note that the processing executed by the CPU reading and executing software (a program) in the above-described exemplary embodiment may be executed by various types of processors other than a CPU. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the above-described processing may be executed by one of these various types of processors, or may be executed by combining two or more of the same type or different types of processors (for example, plural FPGAs, or a combination of a CPU and an FPGA, or the like). Moreover, a hardware configuration of the various processors is specifically formed as an electric circuit combining circuit elements such as semiconductor elements.

Although explanation has been given regarding an example in which the respective programs are stored (installed) in advance in the ROM or the storage in the above-described exemplary embodiment, there is no limitation thereto. The programs may be provided in a format recorded on a recording medium such as compact disc read only memory (CD-ROM), digital versatile disc read only memory (DVD-ROM), or universal serial bus (USB) memory. Alternatively, the programs may be provided in a format downloadable from an external device over a network.

The flow of processing described in the above-described exemplary embodiment is an example, and unnecessary steps may be deleted, new steps may be added, or the processing order may be rearranged within a range not departing from the scope of the present disclosure.

The configurations of the user terminal 10, the vehicle 12, and the center server 30 described in the above-described exemplary embodiment are examples, and may be modified according to circumstances within a range not departing from the scope of the present disclosure.

What is claimed is:

1. An estimation system for a vehicle, comprising:

a user terminal; and an estimation device, wherein:

the user terminal comprises a memory, a processor coupled to the memory, and an imaging unit; and the estimation device comprises a memory, and a processor coupled to the memory, a depth estimation model and a depth estimation equation are stored in the memory, the depth estimation model comprises a plurality of sets of tire tread images and depths of grooves of the tire, and the depth estimation equation estimates a depth of a groove of a tire based on a travel history of the vehicle, wherein:

the processor of the estimation device is configured to:

output an instruction to the user terminal so as to acquire an image of a tread of a tire that is installed at the vehicle, and send the acquired image to the estimation device;

estimate a depth of a groove of the acquired image of the tire tread by the depth estimation model;

acquire a travel history of the vehicle;

estimate a depth of the groove of the tire based on the travel history by the depth estimation equation;

in a case in which a difference between the depth of the groove estimated based on the acquired image and the depth of the groove estimated based on the travel history is greater than or equal to a predetermined difference, render output to the user terminal to actually measure the depth of the groove and send the measured depth to the estimation device; and re-learn the depth estimation model using an additional set of the acquired image and the actual measurement value of the depth of the groove as training data.

2. The estimation system according to claim 1, wherein, in a case in which the depth of the groove estimated based on the image is less than a predetermined depth, the processor of the estimation device is configured to render output to the user terminal to replace the tire.

3. The estimation system according to claim 1, wherein a damage estimation model that estimates whether or not damage has occurred at the tire based on the acquired image is stored in the memory of the estimation device, wherein the processor of the estimation device is configured to:

estimate, based on the acquired image, whether or not damage has occurred at the tire by the damage estimation model; and in a case in which the processor has estimated that damage has occurred at the tire, render output to the user terminal so as to replace the tire.

4. The estimation system according to claim 3, wherein the damage estimation model is a trained model learned using a set of a tread image and a presence or absence of damage to the tire as training data, and damage includes at least one of scratches, splitting, cracks, or uneven wear of the tire.

5. The estimation system according to claim 1, wherein the depth estimation equation differs for each type of tire installed at the vehicle, and the processor of the estimation device is configured to estimate the depth of the groove of the tire by inputting a travel distance acquired from the travel history to a depth estimation equation corresponding to a type of the tire.

6. The estimation system according to claim 1, wherein the depth estimation equation is determined such that the longer a travel distance of the vehicle, the shallower the depth of the groove of the tire.

7. The estimation system according to claim 1, wherein the user terminal further comprises a position acquisition section that acquires a capturing position at which the image of the tread has been captured and sends the capturing position to the estimation device, and the processor of the estimation device is configured to estimate, among a plurality of tires installed at the vehicle, which tire has the tread in the acquired image based on the capturing position.

8. The estimation system according to claim 1, wherein the processor of the estimation device is configured to store the re-learned depth estimation model in the memory of the estimation device.

* * * * *